United States Patent [19]

Leaf et al.

[11] 4,445,720
[45] May 1, 1984

[54] UMBRELLA STORAGE TUBE IN AUTOMOBILE DASHBOARD

[76] Inventors: Sallie Leaf, 364 Charal La., Highland Park, Ill. 60035; Arnold E. Rubin, 9217 Keystone Ave., Skokie, Ill. 60076

[21] Appl. No.: 402,050

[22] Filed: Jul. 26, 1982

[51] Int. Cl.³ ............................................. B60R 7/06
[52] U.S. Cl. .............................. 296/37.12; 135/33 C; 224/42.42
[58] Field of Search ............................ 296/37.12, 37.8; 135/33 C; 224/42.45 R, 42.42, 273

[56] References Cited

U.S. PATENT DOCUMENTS

| | | | |
|---|---|---|---|
| 732,022 | 6/1903 | Young | 135/33 C |
| 1,585,551 | 5/1926 | Katz | 135/33 C |
| 1,697,763 | 1/1929 | Hall | 135/33 C |
| 2,426,113 | 8/1947 | Northcutt | 296/37.13 |
| 3,081,126 | 3/1963 | Theberge | 224/42.42 R |
| 3,779,501 | 12/1973 | Ziebell | 224/42.45 R |

*Primary Examiner*—Robert R. Song
*Attorney, Agent, or Firm*—Cook, Wetzel & Egan, Ltd.

[57] ABSTRACT

An elongated tube with one closed end and one open end is provided in an automobile dashboard for holding a collapsible umbrella and for passing water on the umbrella safely to a drain. The tube is preferably located within the glove compartment of an automobile, behind a lockable door, and is permanently mounted in a downwardly inclined position and with its lower end extending through the cowl or fire wall of the automobile.

5 Claims, 2 Drawing Figures

UMBRELLA STORAGE TUBE IN AUTOMOBILE DASHBOARD

The present invention relates generally to umbrella storage carriers for automobiles. A number of prior U.S. patents have provided umbrella stands or holders in automobiles. Hollow rails and cases for multiple uses are shown in U.S. Pat. Nos. 1,670,962 and 1,697,763. An umbrella holder tube for mounting in various selected places within a passenger compartment is shown in U.S. Pat. No. 1,892,604. A door-mounted holder is shown in U.S. Pat. No. 3,273,769, and a vertical stand is shown in U.S. Pat. No. 3,351,251. None of these patented devices affords convenient storage of a wet umbrella in an automobile, as is often necessary. Seats and floors are made wet and umbrellas are damaged by the lack of suitable space for storage within the automobile.

In accordance with principles of the present invention, an umbrella storage tube is provided which can be formed integrally, as original equipment, with the dashboard in an automobile. An elongated tube of appropriate internal dimensions is provided with a slight downward inclination from an open end to the closed end, so that water on an umbrella will collect in the downward end and from there, in one embodiment, be passed to a drain in front of the fire wall of the automobile. Glove compartment and other dashboard locations can be provided for such storage.

Figure 1:
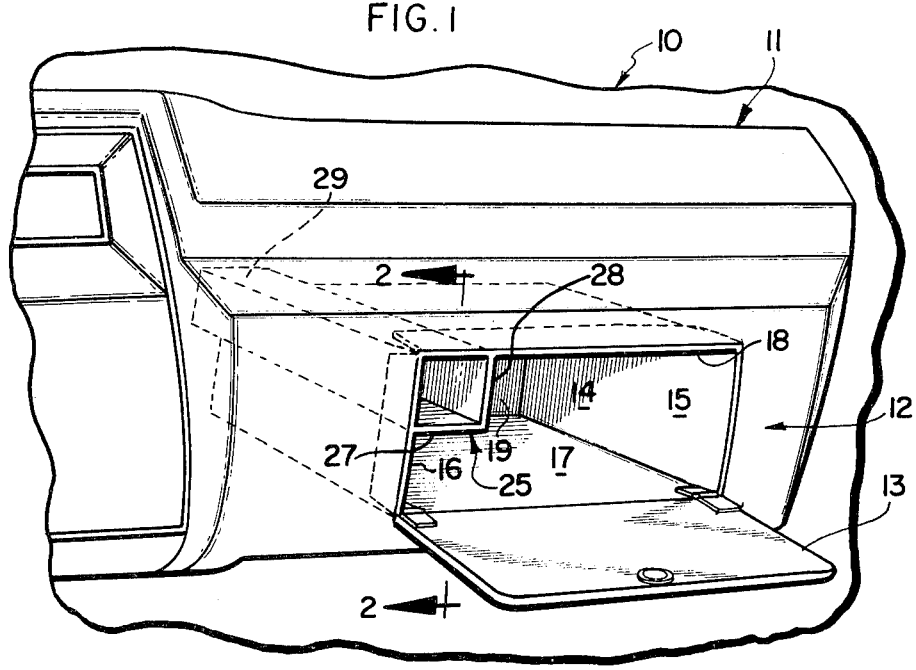
FIG. 1 is a perspective view of a section of the dashboard of an automobile showing the glove compartment with its door open and the umbrella storage tube of the invention formed therein.

An automobile 10 is provided with a dashboard 11 near the front of the passenger compartment, extending from one side of the automobile 10 to the other, beneath the windshield. A glove box or compartment 12 is conventionally provided in the dashboard 11, having a closeable and lockable door 13 which is hinged to conceal and bar access to a space 14 defined by walls 15, 16, 17, and 18 around the top and sides and a rear wall 19. The glove compartment is typically used to store maps, personal items, books, emergency equipment such as flashlights and matches, and similar small articles. Because of the presence of these articles, the glove compartment has never been suited to storage of wet umbrellas.

In accordance with the invention, a storage tube device 25 is provided in the dashboard 11 of the automobile 10 for holding a collapsible umbrella 26. Such umbrella conveniently collapses to an overall length of approximately 12 to 15 inches; many styles and brands are commercially available. Storage tube 25 is provided within the glove compartment 12 by walls 27, 28, 29, and 30 having internal dimensions between them and the cooperating walls 16 and 18 of the glove compartment 12 sufficient to loosely but closely enclose the umbrella in its collapsed configuration. Dimensions of two and three-quarter inches square at the open end tapering to two and a half inches square at the closed end, with a fifteen inch length, are appropriate. The wall 30 closes the tube 25 at one end, while the other end, adjacent the door 13 to the glove compartment 12, is left otherwise open.

Figure 2:
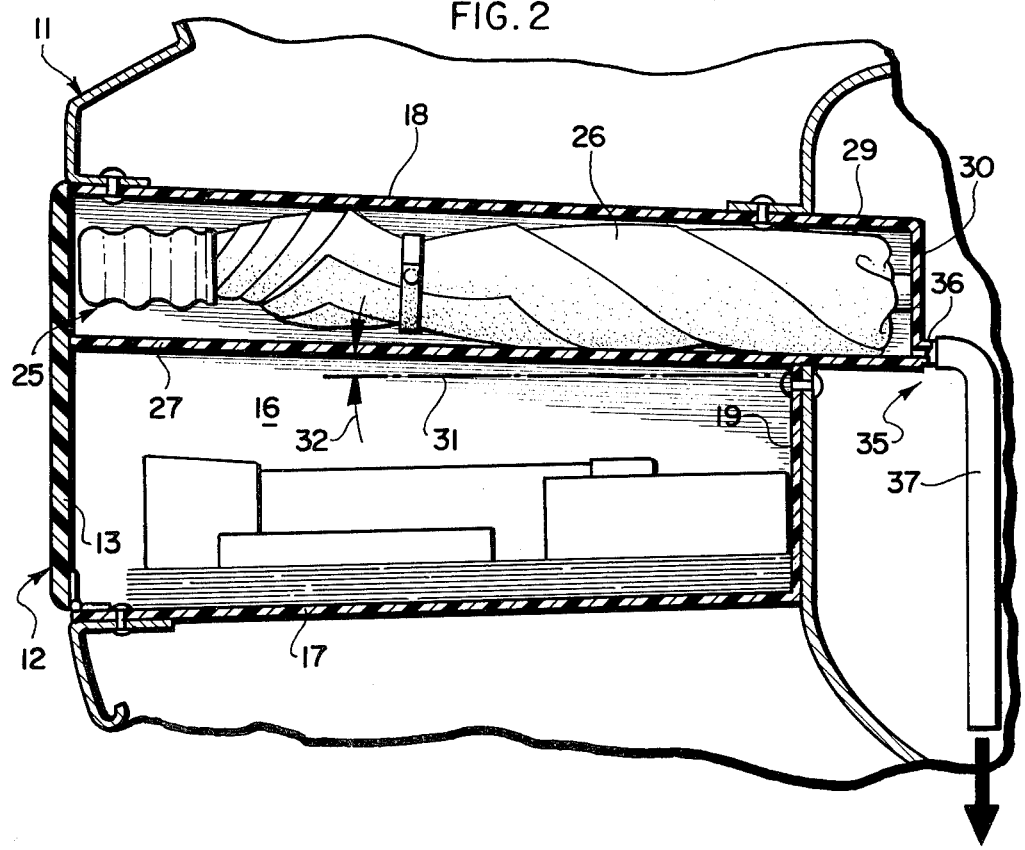
FIG. 2 is a side sectional view, taken on line 2—2 of FIG. 1, showing further details of structure of one form of the invention.

As shown, the tube is formed integrally with the walls 16, 18, and 19 of the glove box 12, as by a plastic molding or sheet metal forming process. The lower wall 27 of the storage tube 26 is downwardly inclined from the horizontal 31 at an angle 32, as shown in FIG. 2. This slight angle encourages water dripping from the umbrella 26 to flow to the closed end 30 of the storage tube 26 rather than to pass to the open end of the compartment adjacent the door 13. A greater or lesser angle of elevation 32, or a raised lip or the like, can be provided for sports cars versus sedans if a flow of water out the open end of the tube should become objectionable in practice.

To dispose of water collected within the tube 25 from the umbrella 26, water disposal means 35 are provided from the lower end of the tube 25. In the embodiment shown, a discharge conduit 36 is provided through the wall 30 immediately adjacent the lower tube wall 27. A hose 37 carries the water collected to drain forwardly of the fire wall or cowl and within the engine compartment of the automobile 10. The lower end of the hose preferably passes to a discharge or disposal zone in a low pressure area in the slip stream of the automobile, so that air and gases do not pass into the tube 25 but rather are drawn from that compartment together with any accumulated water. Alternatively, small drip holes through the lower end of the tube, to pass water to the front face of the firewall, could be employed.

Various modifications may readily be envisioned for adapting the present invention to various models of automobiles and the peculiar dashboard and glove compartment configurations thereof. The present disclosure is therefore illustrative only, and the scope of the invention is not to be limited by the form disclosed but only by the recitations of the accompanying claims.

We claim as our invention:

1. A storage device for a collapsible umbrella in an automobile having a compartment permanently mounted in a dashboard of said automobile and having an openable door controlling access from inside said automobile into said compartment, said device comprising:
   an elongated tube having internal dimensions sufficient to closely enclose said umbrella in a collapsed configuration, the tube being substantially closed at one end and open at an opposite end;
   said tube being permanently mounted in said compartment of said automobile and concealed behind said door and in a position slightly downwardly-inclined from the open end to the closed end; and
   water disposal means for passing liquid collected from the tube to a disposal zone.

2. A storage device as defined in claim 1, wherein said compartment is a glove compartment in said automobile dashboard.

3. A storage device as defined in claim 1, wherein the disposal means includes surfaces forming an aperture through the tube near its lower, closed end.

4. A device as defined in claim 1 or claim 3 wherein the disposal means includes a water drainage tube communicating from inside the lower end of the tube to a lower point which is located outside the compartment and automobile.

5. A device as defined in claim 1, wherein the automobile has a firewall located forwardly of the dashboard and wherein the lower, closed end of the tube passes through the firewall of the automobile.

* * * * *